Figure 1:
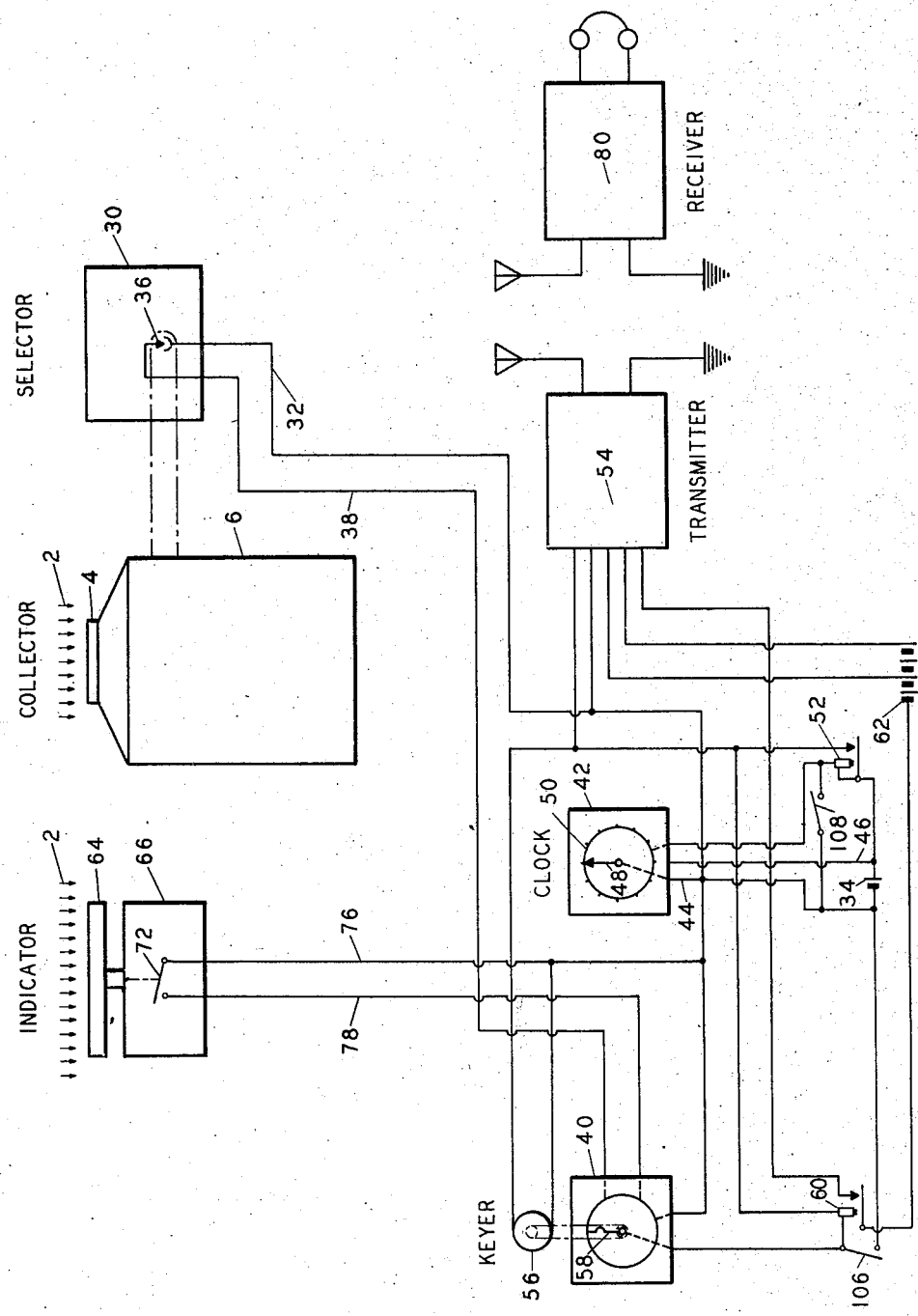

May 11, 1943.   J. E. WHITE   2,318,646

TELEMETRIC SYSTEM

Filed Aug. 1, 1940   3 Sheets-Sheet 2

Jud E. White
INVENTOR

BY Arthur L. Davis
ATTORNEY

May 11, 1943.  J. E. WHITE  2,318,646
TELEMETRIC SYSTEM
Filed Aug. 1, 1940   3 Sheets-Sheet 3

Jud E. White
INVENTOR

BY Arthur L. Davis
ATTORNEY

Patented May 11, 1943

2,318,646

UNITED STATES PATENT OFFICE 2,318,646

TELEMETRIC SYSTEM

Jud E. White, Knoxville, Tenn.

Application August 1, 1940, Serial No. 349,360

2 Claims. (Cl. 177—380)

(Granted under the act of March 3, 1883, as amended April 30, 1928; 370 O. G. 757)

The invention herein described may be manufactured and used by or for the Government for governmental purposes without the payment to me of any royalty thereon.

This invention relates to a telemetric system which is particularly adapted to measure and indicate the amount of precipitation and to indicate whether or not such precipitation is in a liquid or solid state. In this manner it is possible to distinguish precipitation which will run off immediately, such as mist or rain, and that which will result in a delayed run off, such as hail, sleet or snow.

In United States Patent No. 2,207,769, issued July 16, 1940, I have described and claimed a telemetric system which is particularly adapted for indicating changes in liquid levels, such as water in streams. The selector disclosed therein has been found to be quite suitable for the purpose for which it was intended where the variable quantity represents a considerable magnitude. However, in the measurement of precipitation the quantities are often quite small with the corresponding weight of the material collected being insufficient to provide an accurate response unless the selector is particularly susceptible to very slight variations in the quantity being collected.

The principal object of this invention is to provide a selector particularly adaptable for a telemetric system which is extremely sensitive and responsive to small changes in the variable quantity being measured. Another object of this invention is to provide a telemetric system which will measure and indicate small changes in a variable quantity. A further object of this invention is to provide a telemetric system for indicating the physical character of the precipitation measured. Still another object of this invention is to provide a telemetric system for not only indicating the amount of precipitation measured, but also for indicating the character of the precipitation measured by the use of a single source of energy. Other objects of this invention include the use of a telemetric system for the indication of measured precipitation to a distant location at predetermined intervals.

I have discovered a telemetric system having in combination circuit elements forming a plurality of circuits adapted to be opened and closed by a rotatable member, a plurality of liquid contact elements in said circuits actuated by a plurality of projections integral with said rotatable member, and means for moving said member in accordance with the variation of a variable quantity. In measuring precipitation the means for moving said member in accordance with the variation and amount of precipitation collected comprises a counterbalanced floating receiver associated with said rotatable member in such a manner that the said member is directly responsive to the change in the amount of the precipitation collected in said receiver. Since the use of such a combination alone measures and indicates the total amount of precipitation collected regardless of the physical character, an indicator is associated with the above combination, said indicator being responsive only to solid precipitation coming in contact therewith.

Figure 2:
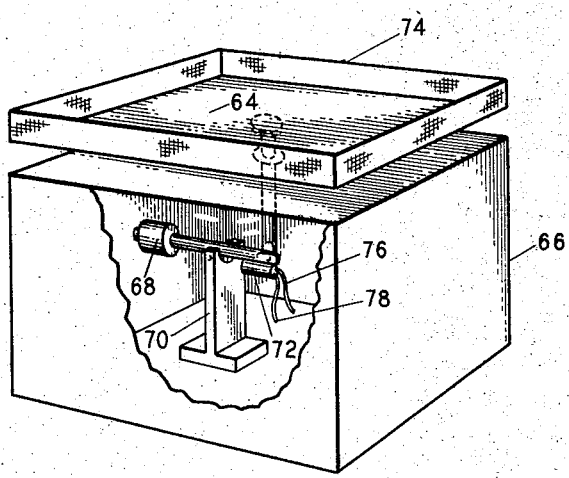
Figure 3:
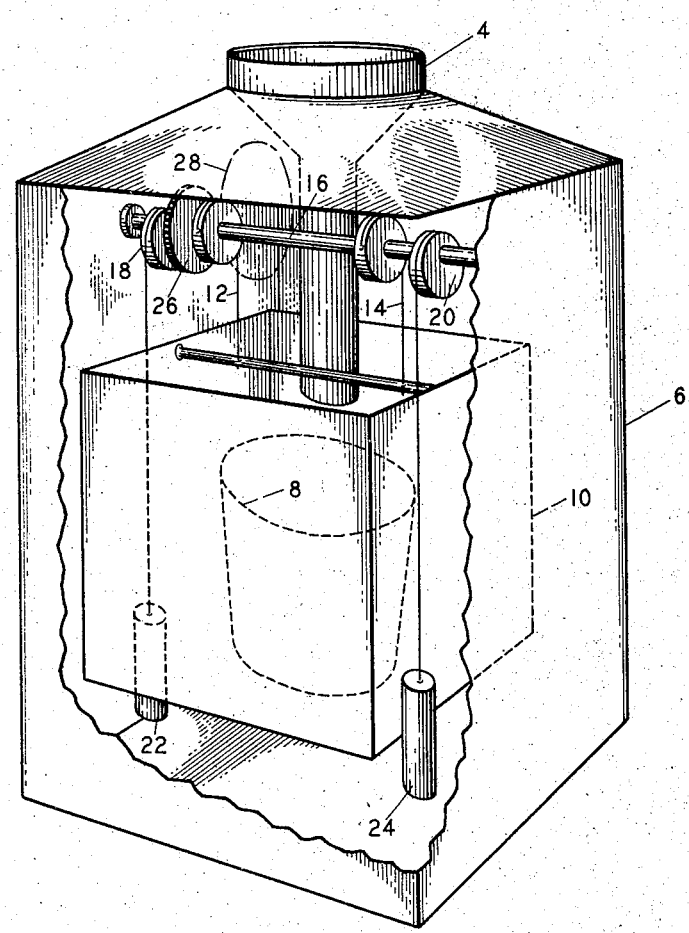
Figure 4:
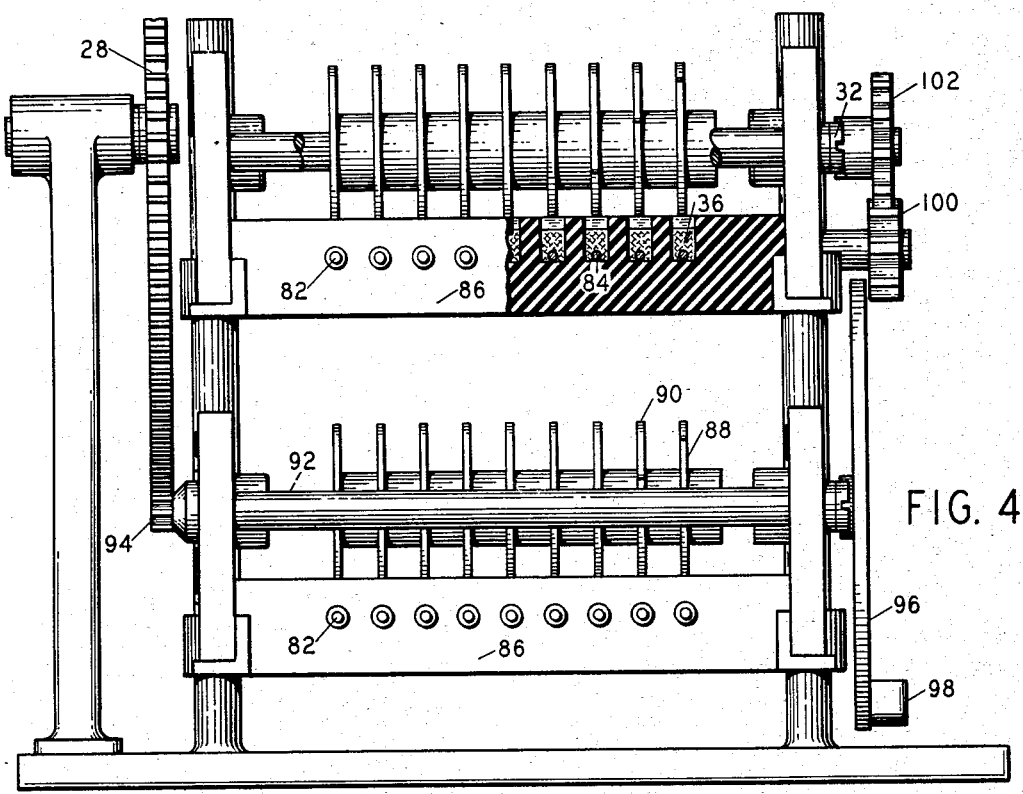
Figure 5:
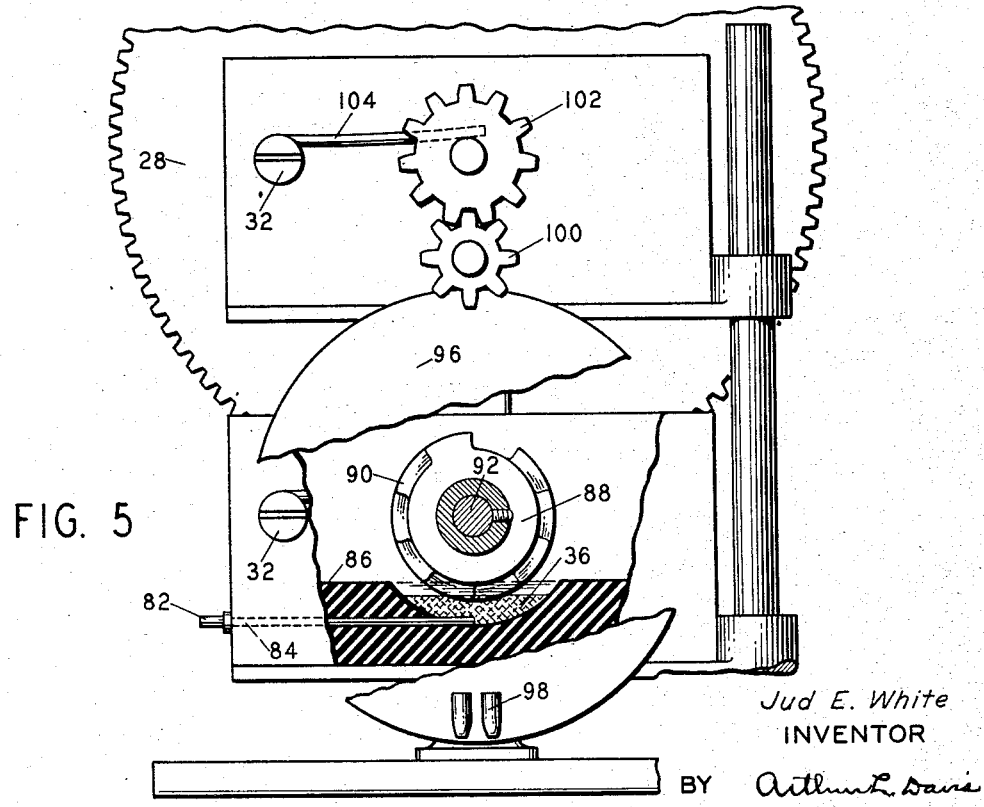

In the accompanying drawings, which form a part of the specification, and wherein reference symbols refer to like parts wherever they occur:

Fig. 1 is a diagrammatic view of one form of apparatus for the embodiment of the invention, Fig. 2 is a perspective view of the indicator with a portion of the shell omitted to show the balancing mechanism therein, Fig. 3 is a perspective view of the collector with a portion of the shell omitted to show the balancing mechanism and collector vessels therein, Fig. 4 is a vertical view of the selector with parts removed to more clearly illustrate the contact mechanism, Fig. 5 is a vertical side view of the selector shown in Fig. 4 with parts removed to more clearly illustrate the contact mechanism.

In Fig. 1, Fig. 2, and Fig. 3 the precipitation 2, falls into a United States Weather Bureau rain receiver 4, mounted on top of a collector 6, and is guided to the center of the collector through a tube into a vessel 8, disposed within the collector. The vessel 8 is supported by an outer vessel 10 which is suspended by cables 12 and 14 from a rotatable shaft 16. The rotatable shaft 16 is provided with an eccentric 18 and an eccentric 20 having suspended therefrom suitable counterweights 22 and 24 respectively. The eccentrics 18 and 20 are so shaped that, when the weight within the vessel 8 is increased due to precipitation and the shaft 16 is thereby rotated, the restraining torque on the rotatable shaft is likewise increased thereby maintaining the apparatus in a state of balance at all times. A gear 26 rigidly secured to rotatable shaft 16 engages a gear 28 which in turn actuates a selector 30 thereby closing a circuit between the electrical conductor 32, from a power supply 34, and a plurality of individually connected contact elements corresponding to the precipitation indication, represented by contact element 36, connected by cable 38, to a keyer 40. A solenoid wound clock 42, energized by conductors 44 and 46 from the power supply 34, turns on the apparatus at predetermined times when hand 48, contacts one of the plurality of contacts, represented by contact 50, thereby energizing a master relay 52, which energizes simultaneously the circuit for a transmitter 54, the keyer 40, and the keyer motor 56. The keyer 40, actuated by the keyer motor 56 which is energized from the power supply 34, rotates the keyer arm 58 clockwise, alternately closing and opening a circuit to relay 60, which thereby conveys electrical impulses, corresponding to the identification of the station and the precipitation indication, to the transmitter 54 by an interruption of energization from power supply 62.

Simultaneously as the precipitation 2 falls into the rain receiver 4 it also falls into precipitation receiver 64, which is disposed above precipitation indicator 66. The precipitation receiver 64 is connected by articulated members to an adjustable counter weight 68 and the entire assembly is supported in a state of balance by member 70. A mercury switch 72 is affixed to the main horizontal member which supports the counter weight. The mercury switch 72 is normally in an "open" position and will remain so if the precipitation is of the immediate run off variety, such as mist or rain, which readily permeates the wire mesh 74 of the receiver 64. However, if the precipitation is of the delayed run off variety, such as hail, sleet or snow, it will not permeate the wire mesh 74 and a "load" will accrue on the receiver 64 causing it to descend. This immediately "closes" the mercury switch 72 and causes the keyer 40 to be energized by the completed circuit between conductors 76 and 78 respectively. The keyer 40 then conveys electrical impulses, corresponding to the identification of the station, extent of precipitation and the state of precipitation indications in a manner similar to that described above to the transmitter 54. The electrical impulses from the transmitter 54 are intercepted by a receiver 80.

In Fig. 1, Fig. 4 and Fig. 5, the plurality of conductors, included in cable 38, from the selector 30, are connected to a plurality of posts, represented by post 82. These posts are connected by a plurality of conductors to a plurality of contact points, not shown, located on the rim of the keyer dial, all of which operate in a manner as set forth in my U. S. Patent No. 2,207,769. The plurality of posts, represented by post 82 are connected to the plurality of contact elements 36 by a plurality of conductors, represented by conductor 84, which extend through the insulation member 86. The insulation member 86 has a plurality of arcuate cavities, each cavity defining a contact element 36 composed of mercury having a layer of insulating oil to minimize oxidation. A plurality of disk-like conductive elements, represented by element 88, is superposed in respective alignment with the contact elements. Each element 88 is provided with a protrusion 90 which upon proper rotation contacts the mercury of element 36 thereby completing a circuit. The plurality of protrusions, represented by protrusion 90, is of successively decreasing peripheral displacement, for example 9 units of the periphery are capable of being immersed in mercury while the tenth unit does not contact the mercury at all as this indication will be translated by a subsequent unit when using the decimal system. This, of course, is essential when a plurality of geared units are utilized. Referring specifically to Fig. 4 and Fig. 5 it is readily seen that on the lower unit the fifth protrusion is immersed in the mercury thereby giving an indication of 0.5 inch, however, the upper unit is in the same relative position which would give an indication of 5.5 inches and is thusly transmitted. This indicated that rotatable shaft 92 to which gear 94 and elements 88 are rigidly secured has made 5½ revolutions, thereby causing gear 96 which is integral with shaft 92 to likewise make 5 complete revolutions in which the gear teeth 98 engaged gear 100 which in turn engaged gear 102 thereby rotating the upper unit. The rotatable members of the various units are provided with anti-friction bearings to keep frictional resistance to a minimum. To insure positive conductivity between the rotatable members and conductor 32 a brush 104 is rigidly affixed to a supporting member of the unit with said brush continuously and positively engaging the rotatable shaft 92. A switch 106 and a switch 108 are provided in the circuit for manual operation of the station during inspection periods.

As will be seen from the above description the selector is provided with a plurality of electrically conductive contact elements, preferably mercury, insulated from each other, each such liquid contact element being adapted to complete an electric circuit upon contact with a projection associated with a rotatable member which has been moved to a predetermined position in response to a predetermined degree of change in the variable quantity.

Likewise, it will be seen that a plurality of such cooperating units, comprising a plurality of liquid contact elements and rotatable elements, may be employed so that the electrical circuits associated therewith may indicate for transmission the measurement of varying units of measurement, such as fractions of inches, inches, and ten inches, respectively, or any other combination of units for which the selector and its associated receiver are calibrated.

The precipitation collector or other device responsive to a change in a variable quantity is so associated with the selector described above that said selector is fully responsive to even relatively small changes in the variable quantity in said collector or such other device. The collector, receiver, or other device initially responsive to a change in variable quantity is preferably counterbalanced and as frictionless as possible in order that all changes in the variable quantity may be promptly and accurately considered to influence a change in position of the rotary member or members of the selector.

The present invention not only provides a combination of apparatus elements susceptible to measuring and indicating even relatively small changes in the variable quantity of substances being measured but also provides for means for indicating change in physical characteristics of the substances being measured. The indicator described above is provided with a liquid permeable receiver so that solid material collecting on said receiver causes an electrical circuit to be closed, thereby indicating that the variable quantity being measured and indicated is solid and not liquid.

It will be seen, therefore, that this invention actually may be carried out without departing from its spirit and scope, with only such changes therein as may be imposed by the prior art.

I claim:

1. A telemetric system for measuring and transmitting measurements and phase of material which may be collected in more than one phase, having in combination (a) circuit elements forming a plurality of mensuration circuits adapted to be opened and closed by a rotatable member, (b) means for moving said member in accordance with the fluctuation of a variable quantity of said material, (c) circuit elements forming a phase circuit adapted to be opened and closed by a contact member which is responsive to a change in phase of said material, (d) means for energizing said circuits, (e) means for transmitting a radio frequency signal, (f) means energized by said mensuration circuits for periodically modifying the transmitted radio frequency signal to indicate the value of the variable quantity, and (g) means energized by said phase circuit for periodically modifying the transmitted radio frequency signal to indicate the phase of the body of the material producing the variable quantity.

2. The telemetric system according to claim 1 wherein (a) said mensuration circuits include a plurality of liquid contact elements actuated by a plurality of projections integral with said rotatable member.

JUD E. WHITE.